US010318102B2

(12) United States Patent
Ito et al.

(10) Patent No.: US 10,318,102 B2
(45) Date of Patent: Jun. 11, 2019

(54) 3D MODEL GENERATION FROM 2D IMAGES

(71) Applicant: Adobe Inc., San Jose, CA (US)

(72) Inventors: Daichi Ito, Los Gatos, CA (US); Radomir Mech, Mountain View, CA (US); Nathan A. Carr, San Jose, CA (US); Tsukasa Fukusato, Tokyo (JP)

(73) Assignee: Adobe Inc., San Jose, CA (US)

( * ) Notice: Subject to any disclaimer, the term of this patent is extended or adjusted under 35 U.S.C. 154(b) by 256 days.

(21) Appl. No.: 15/005,927

(22) Filed: Jan. 25, 2016

(65) Prior Publication Data

US 2017/0212661 A1 Jul. 27, 2017

(51) Int. Cl.
*G06F 3/0481* (2013.01)
*G06F 3/0482* (2013.01)
*G06F 3/0484* (2013.01)
*G06T 15/20* (2011.01)
*G06T 17/20* (2006.01)
*G06T 19/20* (2011.01)

(52) U.S. Cl.
CPC ........ *G06F 3/04815* (2013.01); *G06F 3/0482* (2013.01); *G06F 3/04845* (2013.01); *G06T 15/20* (2013.01); *G06T 17/20* (2013.01); *G06T 19/20* (2013.01); *G06T 2200/04* (2013.01)

(58) Field of Classification Search
None
See application file for complete search history.

(56) References Cited

U.S. PATENT DOCUMENTS

| 6,434,278 B1* | 8/2002 | Hashimoto | G06T 17/00 345/583 |
| 6,704,018 B1* | 3/2004 | Mori | G06T 11/40 345/423 |
| 6,894,686 B2* | 5/2005 | Stamper | A63F 13/02 345/419 |
| 7,646,909 B2* | 1/2010 | Jiang | G06K 9/00208 345/473 |

(Continued)

OTHER PUBLICATIONS

Pighin, F., Hecker, J., Lischinski, D., Szeliski, R., Salesin, D., Synthesizing Realistic Facial Expressions from Photographs, Jul. 2006, ACM Siggraph 2006, pp. 1-10.*

(Continued)

*Primary Examiner* — Said Broome
(74) *Attorney, Agent, or Firm* — SBMC (57) ABSTRACT

Techniques and systems are described to generate a three-dimensional model from two-dimensional images. A plurality of inputs is received, formed through user interaction with a user interface. Each of the plurality of inputs define a respective user-specified point on the object in a respective one of the plurality of images. A plurality of estimated points on the object are generated automatically and without user intervention. Each of the plurality of estimated points corresponds to a respective user-specified point for other ones of the plurality of images. The plurality of estimated points is displayed for the other ones of the plurality of images in the user interface by a computing device. A mesh of the three-dimensional model of the object is generated by the computing device by mapping respective ones of the user-specified points to respective ones of the estimated points in the plurality of images.

20 Claims, 11 Drawing Sheets

(56) References Cited

U.S. PATENT DOCUMENTS

2008/0170755 A1* 7/2008 Nasser ................ G06K 9/2081
382/106
2011/0037831 A1 2/2011 Wang

OTHER PUBLICATIONS

"Combined Search and Examination Report", GB Application No. 1620080.0, dated May 4, 2017, 5 pages.

* cited by examiner

302
Receive one or more image identification inputs describing a respective view of the object that is captured by respective ones of the plurality of images

304
Receive one or more inputs that specify a location of the object in respective ones of the plurality of images

306
Receive a plurality of inputs formed through user interaction r with a user interface, each of the plurality of inputs defining a respective user-specified point on the object in a respective image of the plurality of images

308
Generate a plurality of estimated points on the object, each of the plurality of estimated points corresponding to a respective user-specified point and defined for a different image of the plurality of images than the respective image defining the respective user-specified point

310
Display the plurality of estimated points in the user interface

312
Generate a mesh of the three-dimensional model of the object, the generating including mapping respective ones of the estimated points in the plurality of images to respective ones of the estimated points in the plurality of images

3D MODEL GENERATION FROM 2D IMAGES

BACKGROUND

In a digital medium environment, three-dimensional models may be used to support a variety of functionality. Examples of this functionality include use in games, support different views of objects being modeled in successive images to generate video, employed by a three-dimensional printer to print a physical representation of the model, and so forth.

Conventional techniques used to generate three-dimensional models, however, often required specialized knowledge on the part of a user to interact with a complicated user interface. Thus, these conventional techniques are often overwhelming to users, time consuming, and can also require significant space to support a user interface thereby limiting these techniques to use of feature-rich computing devices. In one conventional example, a user interacts with a user interface to generate simple shapes, such as a cube, sphere, and so on. The user then interacts with the shape to move, rotate, resize, extract, connect, and/or split the simple shapes to make objects. Although this approach is flexible, it involves a significant amount of time to perform through use of complicated user interfaces.

In another conventional example, sculpting is performed in which a user interacts with a mesh in a user interface in a manner similar to shaping physical clay. While this is somewhat intuitive, in actual practice this technique requires the user to have advanced sculpting skills and mastery of complicated tools. In yet another conventional example, a three-dimensional scan is performed by a 3D scanning machine. Thus, in this example a user is required to already have an example of the object being modeled, requires expensive machinery or otherwise a low quality model is formed with noise and errors. Thus, conventional 3D model generation techniques are unintuitive, expensive, and require extensive knowledge and therefore are limited to use in a limited number of instances.

SUMMARY

Techniques and systems are described to generate a three-dimensional model from two-dimensional images. In one example, a digital medium environment is configured to generate a three-dimensional model of an object from a plurality of images having different two-dimensional views of the object. A plurality of inputs are received, formed through user interaction with a user interface. Each of the plurality of inputs define a respective user-specified point on the object in a respective image of the plurality of images. A plurality of estimated points on the object are generated by a computing device. Each of the plurality of estimated points corresponds to a respective user-specified point and is defined for a different image of the plurality of images than the respective image defining the respective user-specified point. The plurality of estimated points is displayed in the user interface by the computing device. A mesh is generated of the three-dimensional model of the object by the computing device by mapping respective ones of the user-specified points to respective ones of the estimated points in the plurality of images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques used to generate three-dimensional models often involve interaction with complicated user interfaces and require advanced skills on the part of a user in order to generate the model. Consequently, these techniques are typically not employed by users lacking these skills, even though these users may have advanced skills in other areas of image generation.

Techniques and systems are described to generate three-dimensional models from two-dimensional images. In this way, users that are capable of creating two-dimensional images of an object may use these images to generate the three-dimensional model in an intuitive and efficient manner without having advanced knowledge of specialized tools. For example, a user first provides a plurality of images of an object. The user then specifies which views of the object are captured by respective ones of the images, e.g., front, back, side, top, bottom, and so forth.

The images are then displayed in a user interface such that a user may indicate correspondence of landmarks between the images that are to be used as a basis to generate a three-dimensional model through the landmarks and knowledge of the different views that are captured by respective images. For instance, a user may first indicate a point at an end of a nose of a face captured in a first one of the images (e.g., a front view), which is referred to as a user-specified point. The computing device then estimates an estimated point in a second one of the images, e.g., a side view. This estimation may be performed automatically and without user intervention in response to receipt of the user-specified point, upon receipt of a user input to initiate the estimation, and so forth. The estimated point is configured to be moved by the user, e.g., to correct an error in the estimate such that the end of the nose of the user is accurately reflected by the points. This process is then repeated by interacting with the different images to indicate correspondence between points which is aided by an initial estimation, thereby improving efficiency and accuracy.

The correspondence of the points and the knowledge of the different views in the images is then used to generate a mesh that maps the points to each other in three-dimensional space. A texture is then taken from the images and overlaid over the mesh to form a three-dimensional model of the object in the images. In this way, the three-dimensional model may be generated in an efficient, intuitive, and accurate manner from two-dimensional images that are typically readily available from users as part of content creation. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
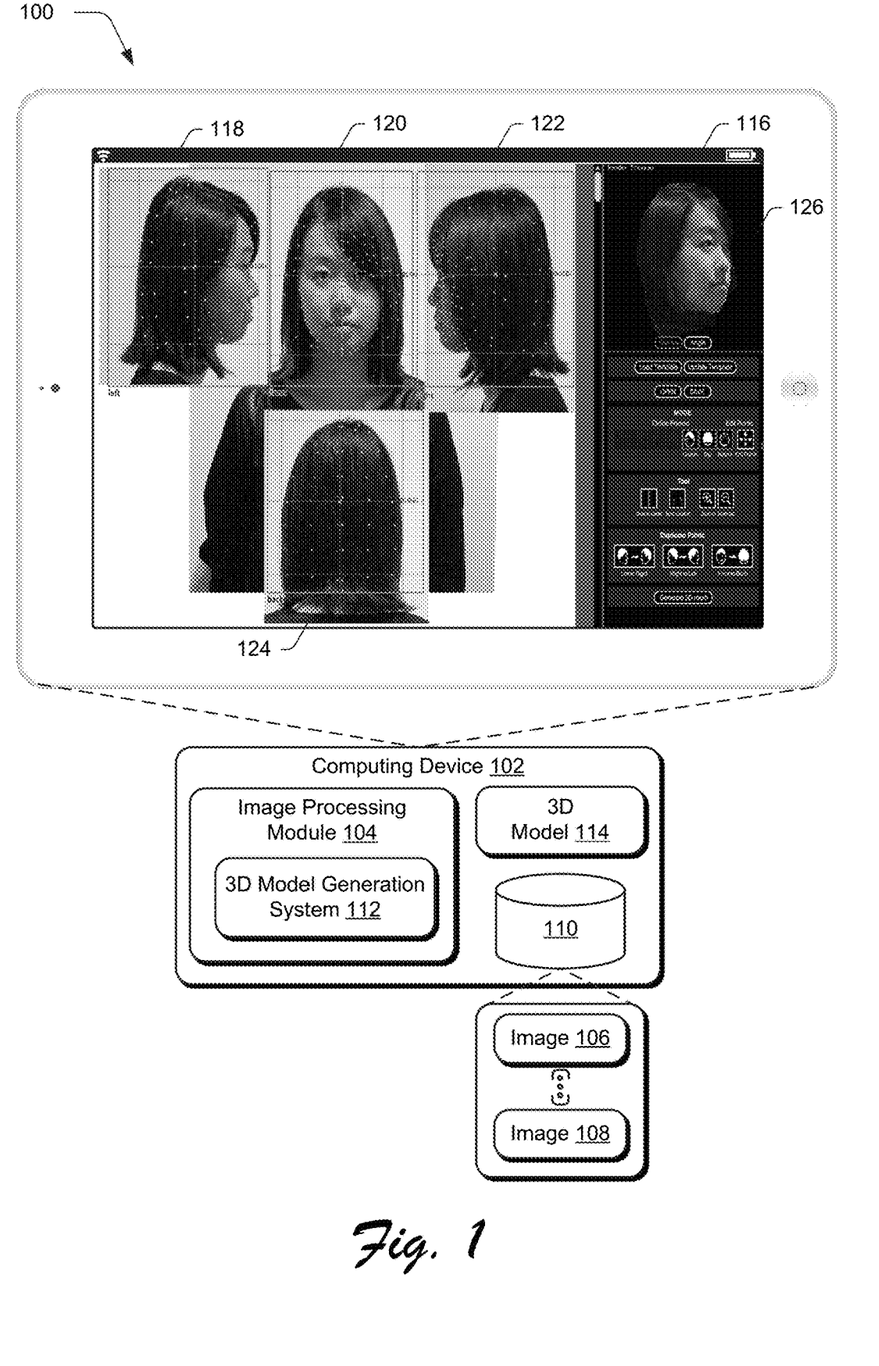
FIG. 1 is an illustration of an environment in an example implementation that is operable to employ model generation techniques described herein.

FIG. 1 is an illustration of an environment 100 in an example implementation that is operable to employ model generation techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 11.

The computing device 102 is illustrated as including an image processing module 104. The image processing module 104 is representative of functionality to transform images 106, 108 to create new or modified versions of the images 108, 108, examples of which are illustrated as maintained in storage 110 of the computing device 102.

Examples of image processing include removal of noise from an image, object removal, hole filling, application of filters (e.g., Gaussian blur), object recognition, semantic tagging, and other techniques that alter pixels included in the images 106, 108, associate data with the images 106, 108 to support other functionality (e.g., image search), and so forth. Although functionality of the image processing module 104 is illustrated as being implemented solely on the computing device 102, this functionality may also be further divided, such as provided in whole or in part "in the cloud" as further described in relation to FIG. 11.

An example of image processing functionality is illustrated as a three-dimensional (3D) model generation system 112. The 3D model generation system 112 is representative of functionality usable to generate a 3D model 114 from the images 106, 108. The images 106, 108, for instance, may be two-dimensional images of an object capturing different views of the object, an example of which is output in a user interface 116 of the 3D model generation system 112.

As illustrated in the user interface 116 of the system, for instance, a first image 118 captures a right-side view of a person's head, a second image 120 captures a front view of the person's head, a third image 122 captured a left-side view of the user's head, and a fourth image 124 captures a back view of the user's head. From these images 118-124, the user may select points in one of the images for landmarks in one of the images 118-124, e.g., tip of nose, corners of the user's eyes, hairline, etc.

These user-specified points are then used by the 3D model generation system 112 to estimate corresponding estimated points in other ones of the images 118-124, which are moveable to correct any errors in estimation. In this way, the 3D model generation system 112 learns which points in the images 118-124 correspond to each other, which is used to generate a mesh from the points and from this mesh, the 3D model 114 of the object (e.g., the user's head) included in the image 116. In one or more implementations, a rendered output 126 of the 3D model 114 is displayed in real time by the 3D model generation system 112 such that a user may view a result of indication of these correspondences and thus may decide when a 3D model 114 having sufficient detail has been achieved in a non-modal manner, e.g., that would involve navigation away from the user interface 116. Further discussion of an example of generation of the 3D model 114 is described in the following and shown in corresponding figures.

Figure 2:
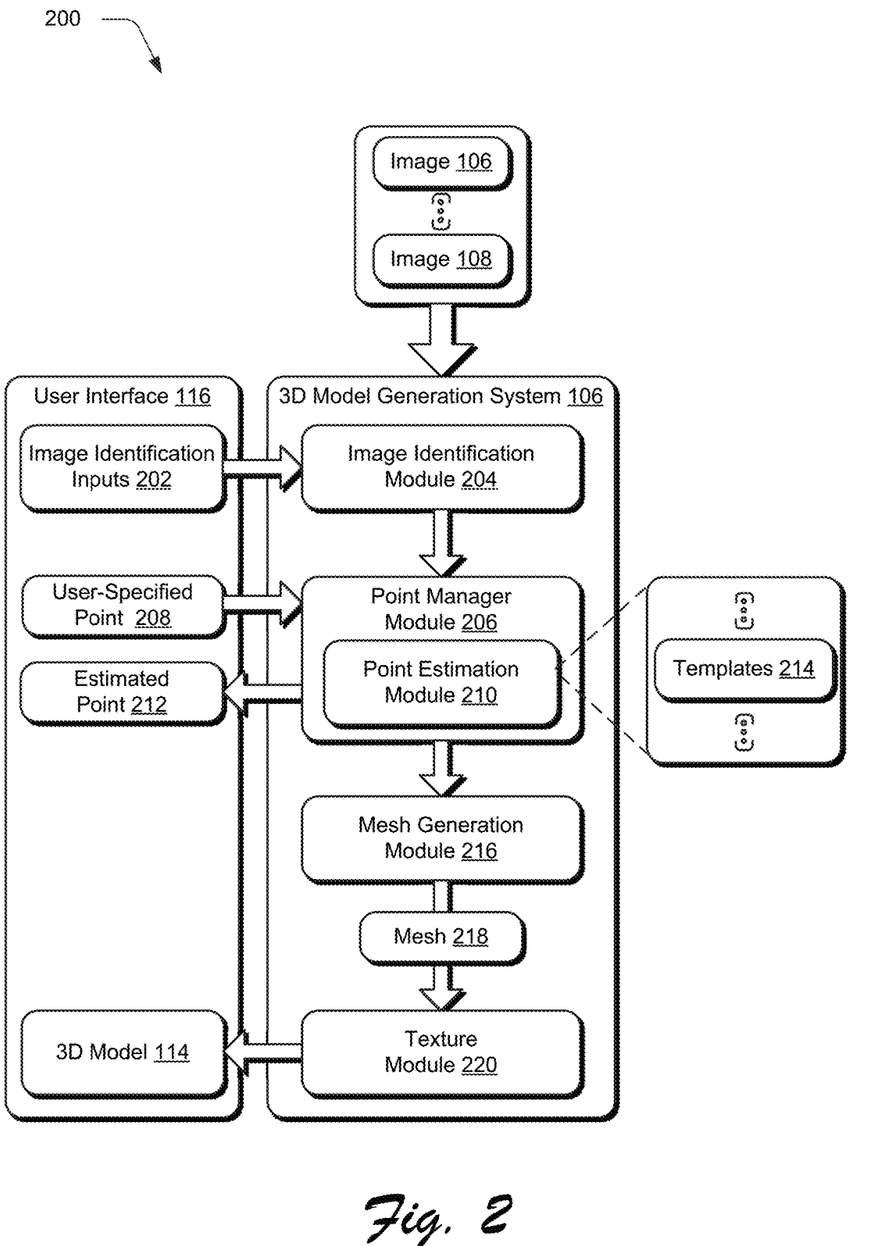
FIG. 2 depicts a system showing operation of a three-dimensional model generation system of FIG. 1 in greater detail.
Figure 3:
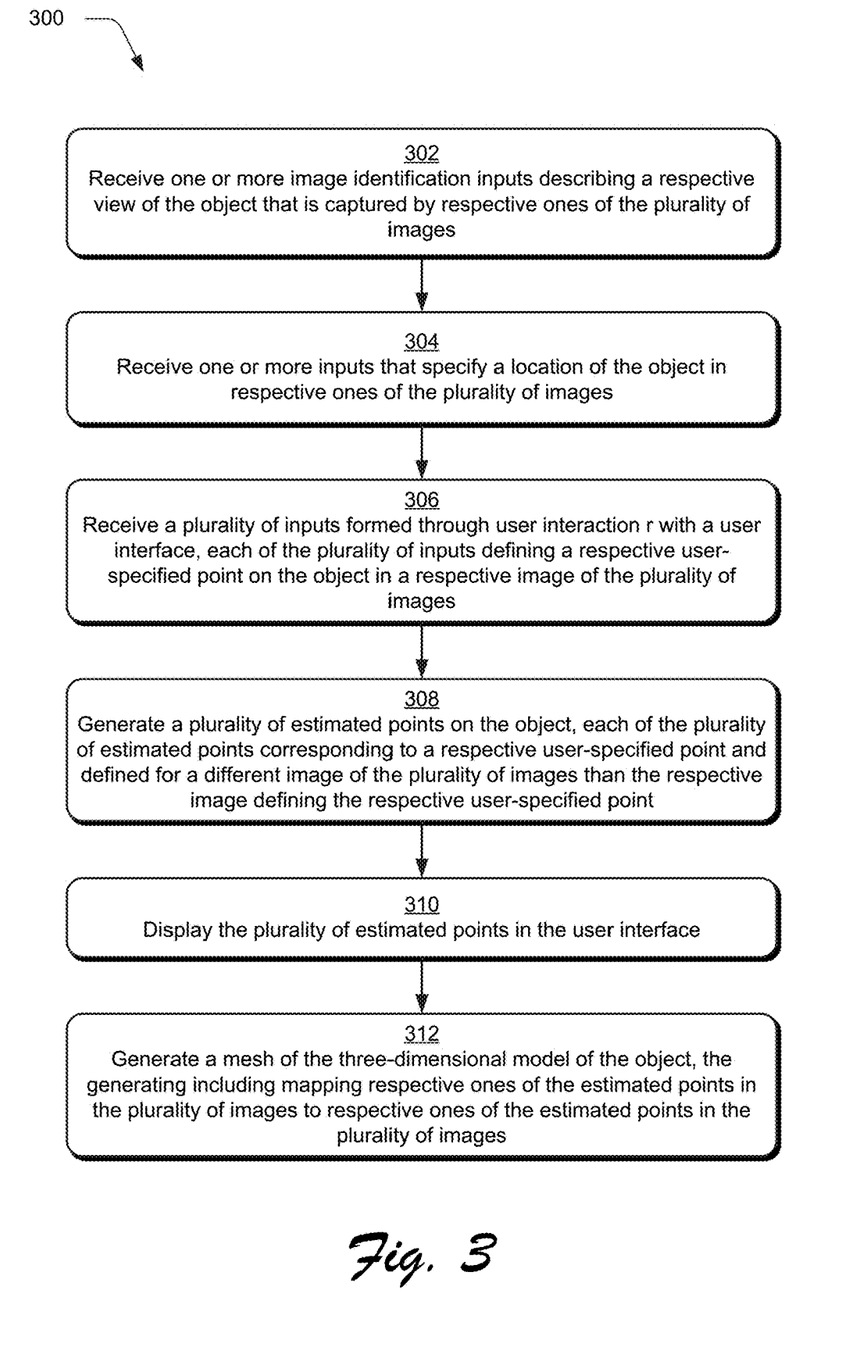
FIG. 3 is a flow diagram depicting a procedure in an example implementation in which a three-dimensional model is generated from two-dimensional images.

FIG. 2 depicts a system 200 showing operation of the 3D model generation system 106 of FIG. 1 in greater detail. FIG. 3 depicts a procedure 300 in an example implementation in which a three-dimensional model is generated from two-dimensional images. In the following, the discussion refers to both the system 200 and the procedure 300 as well as examples of the user interfaces in the figures that follow.

Aspects of each the procedure may be implemented in hardware, firmware, or software, or a combination thereof. The procedure is shown as a set of blocks that specify operations performed by one or more devices and are not necessarily limited to the orders shown for performing the operations by the respective blocks.

The 3D model generation system 106 first obtains a plurality of images 106, 108, to generate the three dimensional model 108. The techniques described herein are usable to generate the 3D model 114 from two images having different views of an object to be modeled (e.g., through use of mirroring as further described below), although additional images may also be employed as illustrated in FIG. 1.

To begin with in this example, one or more image identification inputs are received that describe a respective view of the object that is captured by respective ones of the plurality of images (block 302). A user, for instance, may interact with the user interface 116 to upload images and provide image identification inputs 202 to also specify a relationship that the images have in relation to each other by specifying which view of the object is captured by the respective images.

As shown in FIG. 1, a first image 118 captures a right-side view of a person's head, a second image 120 captures a front view of the person's head, a third image 122 captured a left-side view of the user's head, and a fourth image 124 captures a back view of the user's head. In this way, an image identification module 204 may determine that the first, second, third, and fourth images 118-124 capture different views of the object (e.g., the user's head) along a single plane at ninety degree increments, e.g., a module implementing logic to identify images using hardware such as a processor, memory, fixed or programmable integrated circuit, and so forth. From this, the image identification module 204 may construct a three-dimensional space and a relationship of the first, second, third, and fourth images 118-124 to that space. A variety of different views and relationships between views of objects to be modeled may be expressed via the image identification inputs 202, such as a particular angle between the views, specification of vectors in a three-dimensional space (e.g., by drawing arrows in a three-dimensional sphere in which each corresponds to a receive view captured by an image), use of pre-configured views (e.g., top, bottom, front, back, three-quarter view), and so forth.

Figure 4:
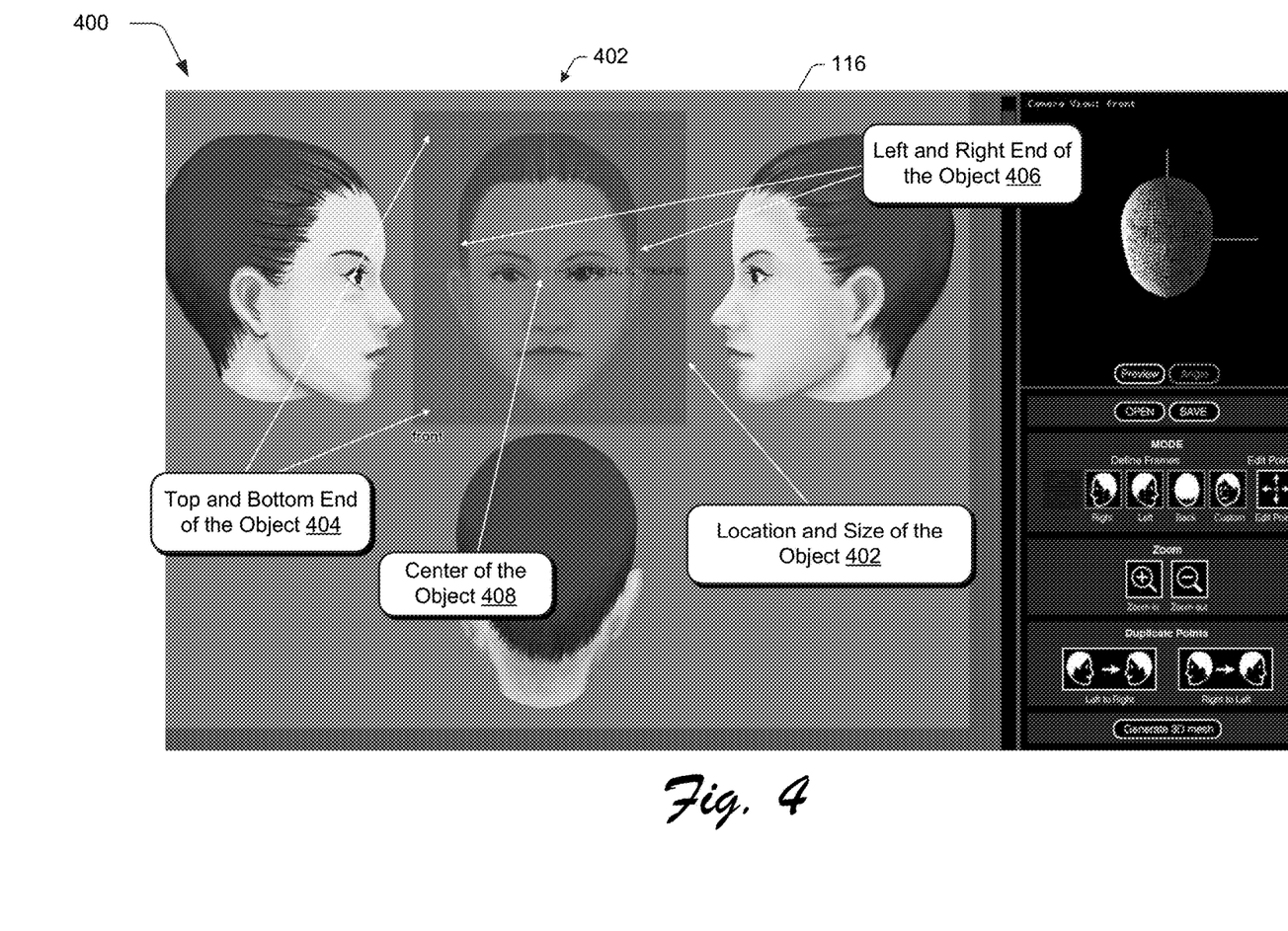
FIG. 4 depicts a user interface usable to specify a location and size of an object within images that is to be modeled.

In order to obtain the accurate point data, the image identification inputs 202 may also specify a location and a size of the object in respective ones of the plurality of images (block 304). As shown in an example implementation 400 of FIG. 4, for instance, the user interface 116 includes an image 402 having a front view of an object, e.g., a user's head. The user interface 402 is configured to specify a location and size of the object 402 within the image 402. In this example, this includes specifying a top and bottom end of the object 404, a left and right end of the object 406, and a center of the object 408. In this way, the image identification module 204 may utilize objects in the images that have different sizes within the images through comparison of these locations and bounding boxes formed from the specified outputs. Thus, the image identification module 204 may dynamically address a greater range of images than was previously possible using conventional techniques that required matching sizes of objects within images in order to generate a 3D model.

This information is then provided by the image identification module 204 to the point manager module 206. The point manager module 206 is representative of functionality usable to indicate correspondence of points in respective images 106, 108 in the user interface 116, e.g., a module implementing logic to indicate identify and indicate corresponds of points using hardware such as a processor, memory, fixed or programmable integrated circuit, and so forth. As part of this, a plurality of inputs is received that are formed through user interaction with a user interface 116. Each of the plurality of inputs defines a respective user-specified point 208 on the object in a respective image of the plurality of images (block 306).

Figure 5:
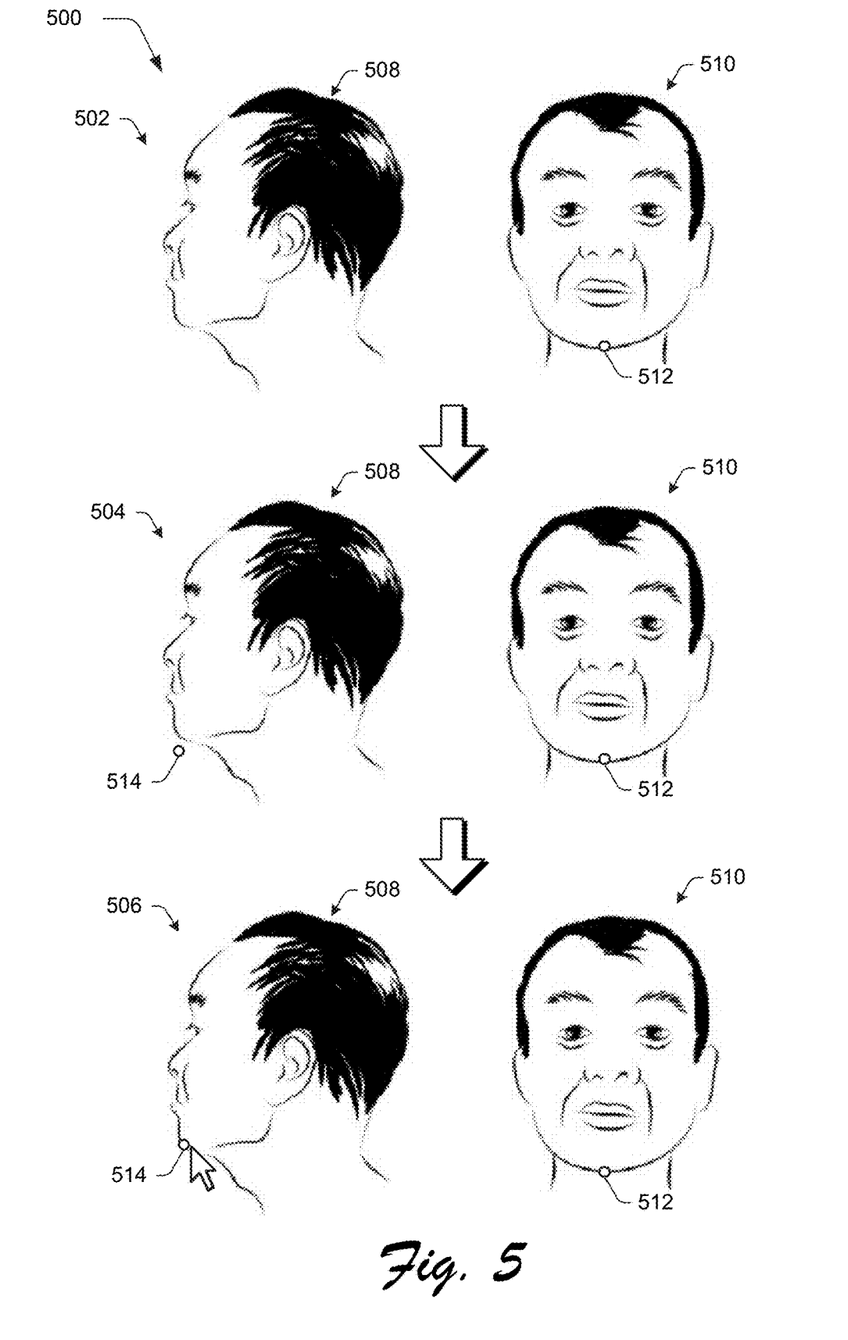
FIG. 5 depicts a system in an example implementation in which a user-specified point in one image is used to estimate an estimated point in another image as part of generation of a three-dimensional model from two-dimensional images.

FIG. 5, for instance, depicts a system 500 in an example implementation in which a user-specified point in one image is used to generate an estimated point in another image as part of generation of a three-dimensional model from two-dimensional images. This system 500 is illustrated using first, second, and third stages 502, 504, 506 of interaction via a user interface 116 with first and second images 508, 510.

At the first stage 502, an input specifying a location of a user-specified point 512 on an object in the second image 510 is received, the input caused through interaction with the user interface 116. A user, for instance, may use a cursor control device (e.g., a mouse or trackpad), touchscreen functionality of a display device, and so on to note a landmark of a user's chin as the user-specified point 512.

In response, the point manager module 206 employs a point estimation module 210 implemented at least partially in hardware to generate an estimated point 514 on the object, which may or may not be done automatically and without user intervention. For example, this estimation may be performed automatically and without user intervention responsive to receipt of the user-specified point, performed in response to initiation of functionality by a user, and so forth. The point estimation module 210 is representative of functionality to form estimated points 212 based on the three-dimensional space learned from the image identification module 204, e.g., through knowledge of where the user-specified point 208 is located on the second image 510 to estimate a corresponding location on the first image 508. This may be performed in a variety of ways.

In one example, the point estimation module 210 uses one or more templates 214 to perform the estimation. The templates 214, for instance, may act as rough models that are used to estimate the points. The templates 214 may be selected automatically and without user intervention 210, e.g., through use of object detection functionality to estimate a type of object being modeled and then select from a plurality of preconfigured templates 214 to select which of the templates best corresponds to the object. In another example, the templates 214 are selected by a user through interaction with the user interface 116, e.g., to select a "face," "car," "figurine," or other object. In another example, the templates 214 could be generated or improved by the current user defined points. In another example, the templates 214 could be generated or improved by the landmark detection algorithm from the input images.

Regardless of how the template is selected or even how the estimated point is estimated, the estimated point 514 is then displayed in the user interface 116 on the first image 508 as shown at the second stage 504 of FIG. 5. Thus, in this example a user has specified a user-specified point 512 on the second image 510 which causes an automatic display of an estimated point 514 on the first image 508, both of which are displayed simultaneously such that a user need not flip "back and forth" between user interfaces, although that example may also be utilized. Because the second point 514 is estimated, it may lack some accuracy in indicating a corresponding landmark in the object to be modeled, e.g., the user's chin. Accordingly, a user may utilize a cursor control device, touchscreen, or other input to move the estimated point 514 to a desired location on the object, an example of which is shown at the third stage 506 of FIG. 5. The user-specified points 512 may also be moved and moved again by a user as desired.

This process may continue to estimate a plurality of estimated points on the object automatically and without user intervention, with each of the estimated points corresponding to a respective user-specified point for a different image of the plurality of images than the respective image defining the respective user-specified point (block 308), which are then displayed in the user interface (block 310). Color coding or other indicia may be used to show which estimated point is "newly added" in response to addition of a user-specified point on another one of the images and thus indicate correspondence between points in the images. Further, user-specified points may be added 208 interchangeably to either the first or second images 508, 510 with the estimated points 212 being automatically generated for the other one of the first or second images 508, 510. In this way, a user may interact with the images in a dynamic, efficient (either image may receive inputs), and intuitive manner to specify a plurality of points.

A mesh of the three-dimensional model of the object is then generated as a mapping of respective ones of the user-specified points to respective ones of the estimated points in the plurality of images (block 312). As shown in FIG. 2, the user-specified points 208 and the estimated points 212 (whether further moved in the user interface 116 or not) are provided to a mesh generation module 216, e.g., a module implementing logic to generate a mesh using hardware such as a processor, memory, fixed or programmable integrated circuit, and so forth. The mesh generation module 216 is representative of functionality to compute a mesh 218 in three dimensions that links pairs of the user-specified points and estimated points 212 to other pairs in three-dimensional space through knowledge of a relationship of the images 106, 108 to views of the object being modeled, i.e., the formation of the three-dimensional space and the relationship of the images to that space. In this way, the mesh 218 forms a frame of the model to be formed. In one or more implementations, the mesh generation module 216 is configured to normalize locations of pairs of user-specified points and estimated points as part of generation of the mesh, and thus limit potential errors in either one of the points.

Figure 6:
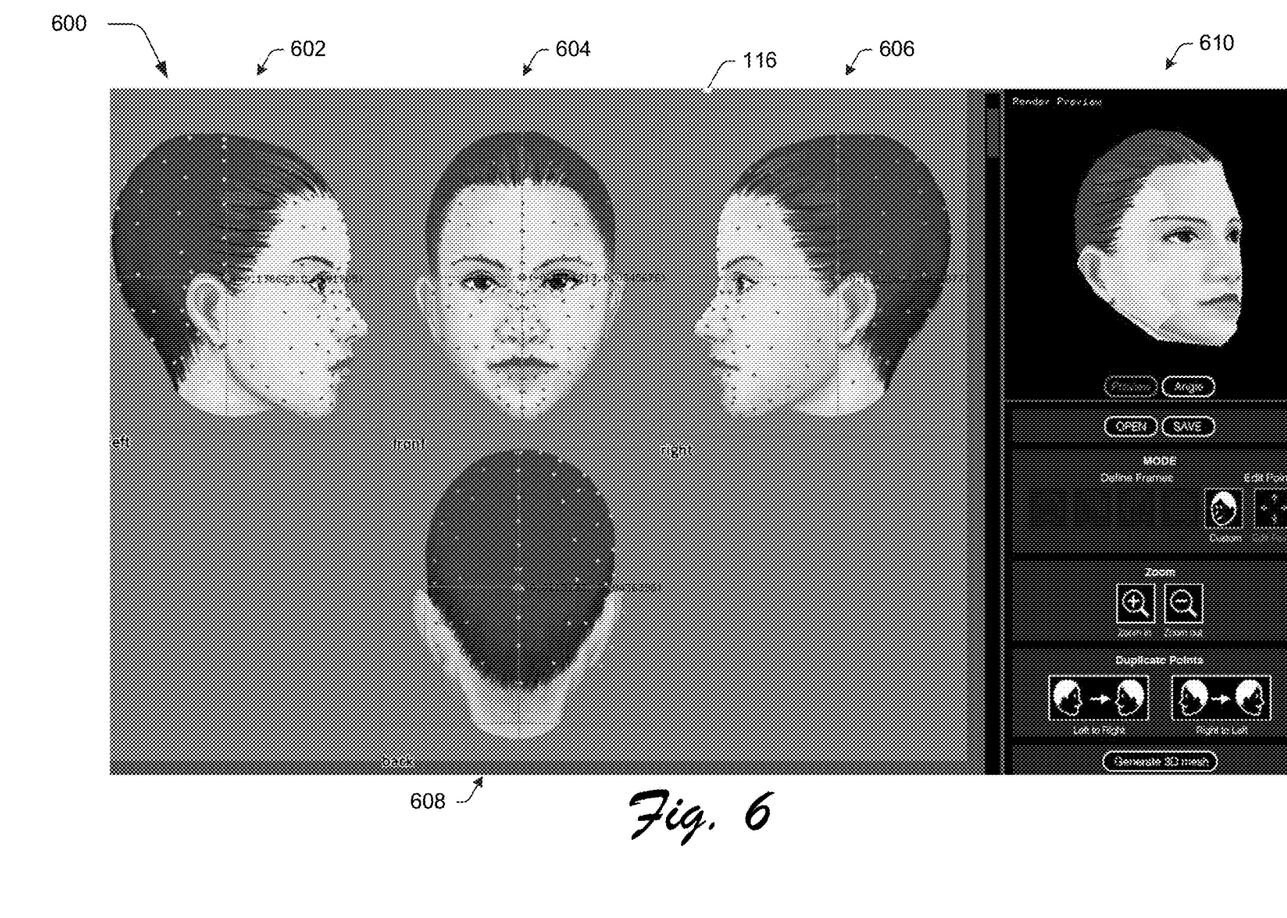
FIG. 6 depicts an example of simultaneous display of two-dimensional images, points, and real time display of a three-dimensional model that is generated from the points on the two-dimensional images.
Figure 7:
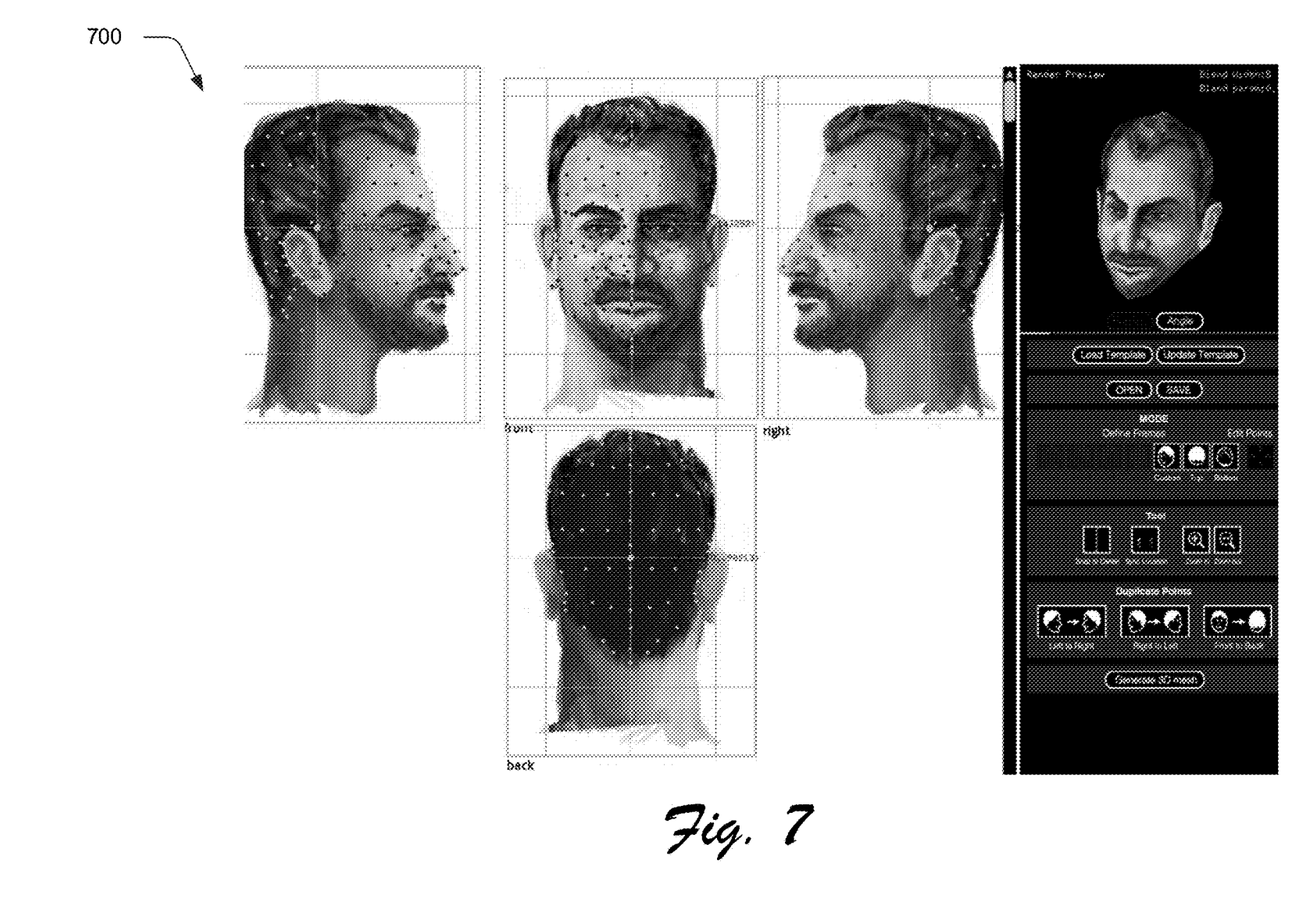
FIGS. 7, 8, and 9 depict other examples of simultaneous display of two-dimensional images and real time display of a three-dimensional model for a variety of different types of objects.

A texture module 220 is then employed by the 3D model generation system 106 to overlay a texture formed from the images 106, 108 over the mesh 218 to form the 3D model 114, which is then output in the user interface 116. As in the other example, the texture module 220 may be implemented as a module using hardware such as a processor, memory, fixed or programmable integrated circuit, and so forth. An example 600 of this process is shown in an example implementation of FIG. 6. In this example, the user interface 116 includes four two-dimensional images 602, 604, 606, 608 and corresponding points as indicated above. The user interface 116 also includes a real time display 610 of the three dimensional model 114 that is formed as the user-inputs are received to estimate the estimated inputs, and is further updated based on subsequent movement of either ones of the inputs. In this way, through use of the mesh and overlaid texture a user may view a display of the model as inputs are provided in order to modify the inputs as desired as well as to determine when a desired level of detail is achieved.

Figure 8:
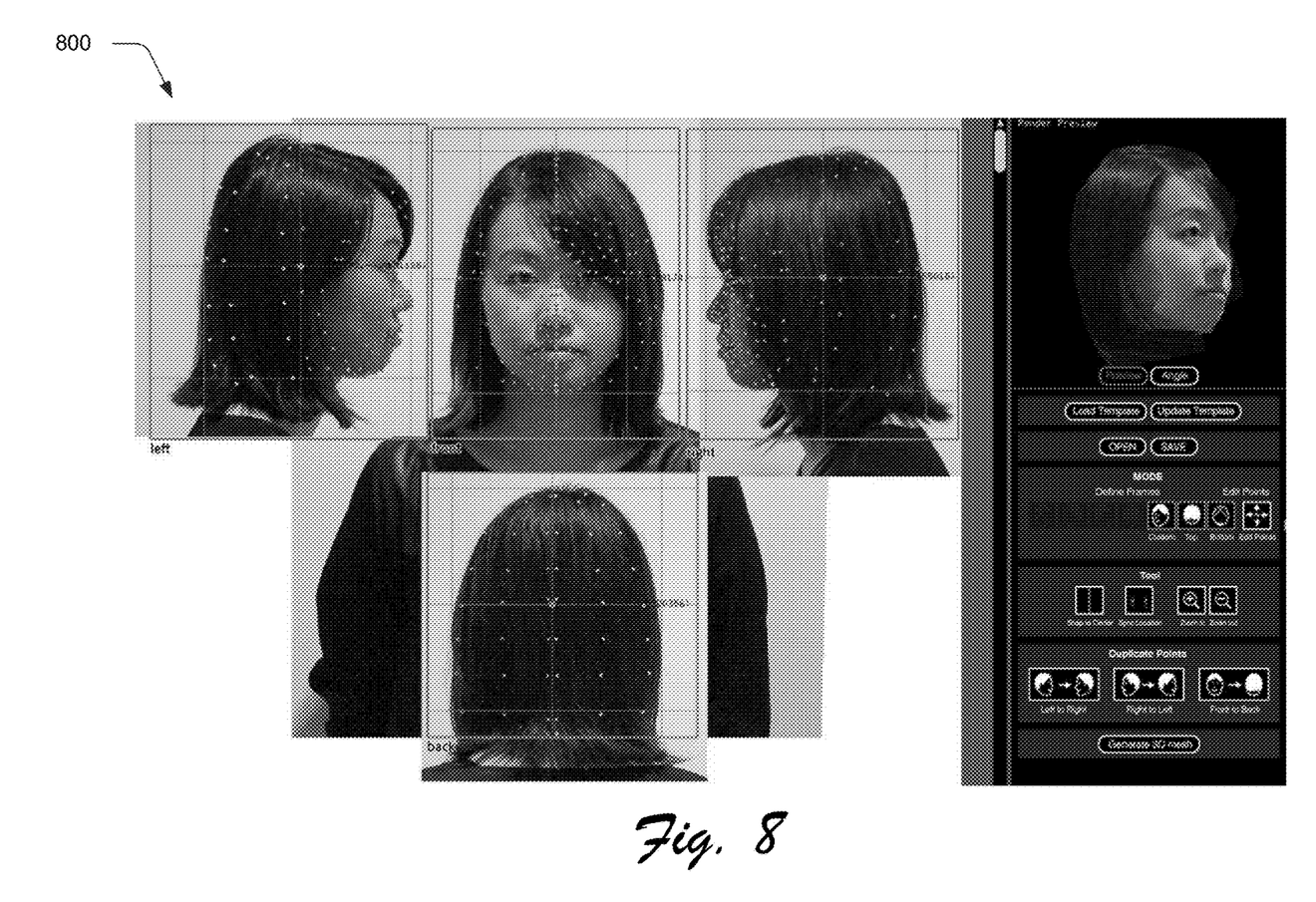
Figure 9:
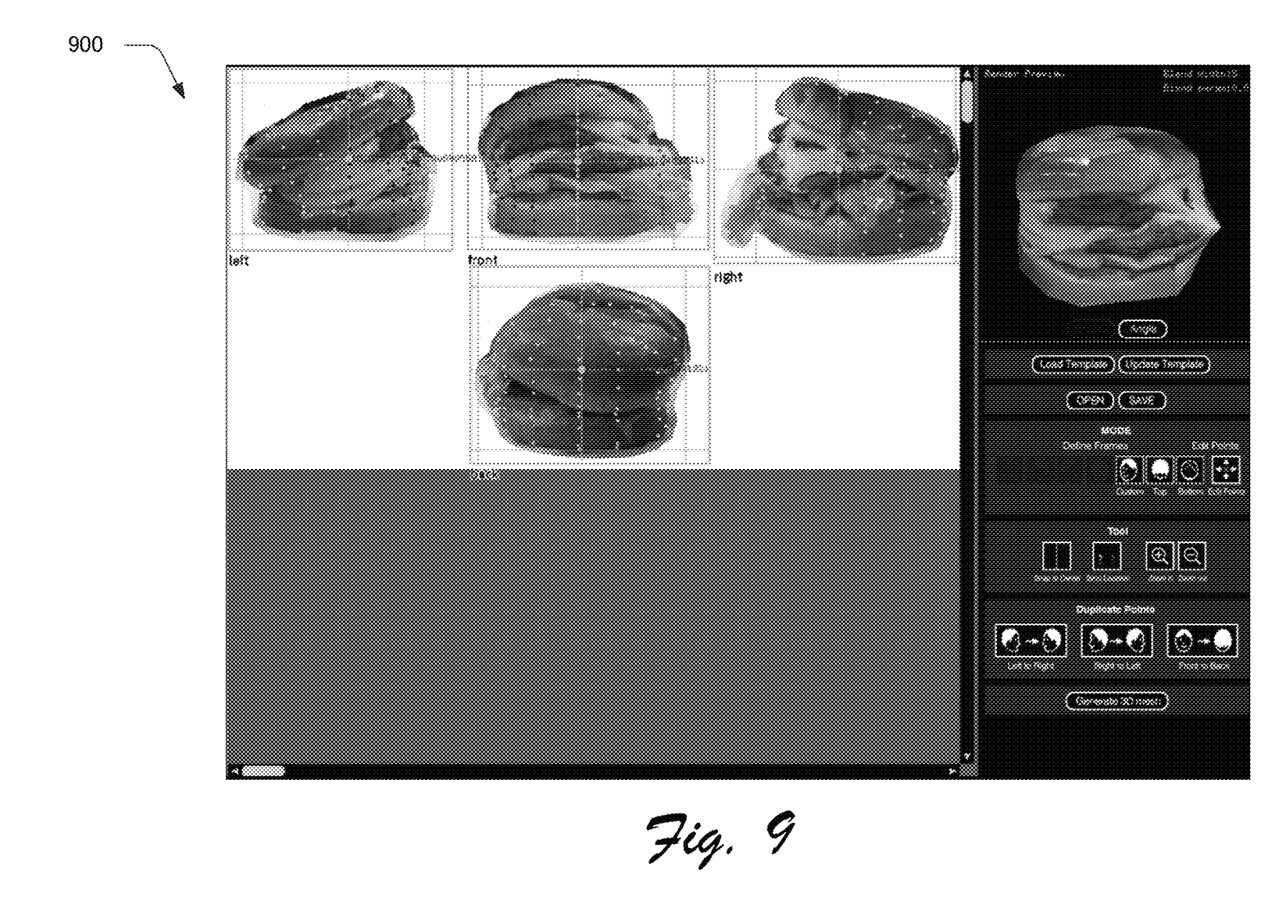

A variety of different objects may be modeled in three dimensions from two-dimensional images. FIG. 8 depicts an example 800 of a user's head taken from different views captured in four images. FIG. 9 depicts an example 1100 of a three-dimensional model of a cheeseburger modeled from images.

Three-dimensional models formed using the techniques described herein may also be combined to form larger models. For example, a pencil drawing of a cartoon character's head may be used to form a three-dimensional model of the head. This head may then be combined with other three-dimensional models that are also made by this system to form an entire body of the cartoon character.

Figure 10:
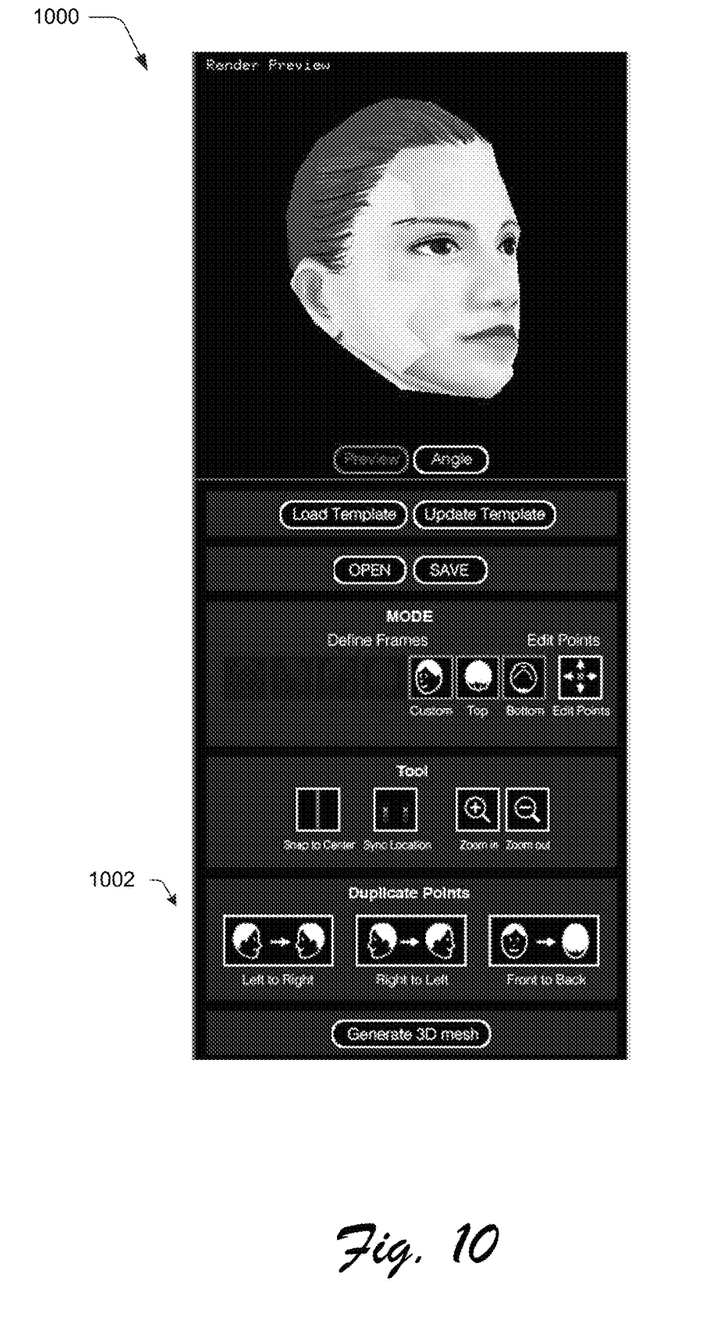
FIG. 10 depicts a user interface usable to initiate functionality to mirror points such that a model is generated that includes portions of an object that are not viewable in images used to create the model.

The 3D model generation system 106 may also include functionality to automatically generate points for points of the model that are not viewable in the images. For example, two different views from a side of an object (e.g., a face) as shown in an example 1000 of FIG. 10 may be "mirrored" by the 3D model generation system 106 in order to complete a model. Illustrated examples include of mirror functionality include left-to-right, right-to-left, and front-to-back which may be selected by a user to automatically "fill in" other portions of the 3D model 114 as desired even if those portions are not viewable in the images 106, 108.

Example System and Device

Figure 11:
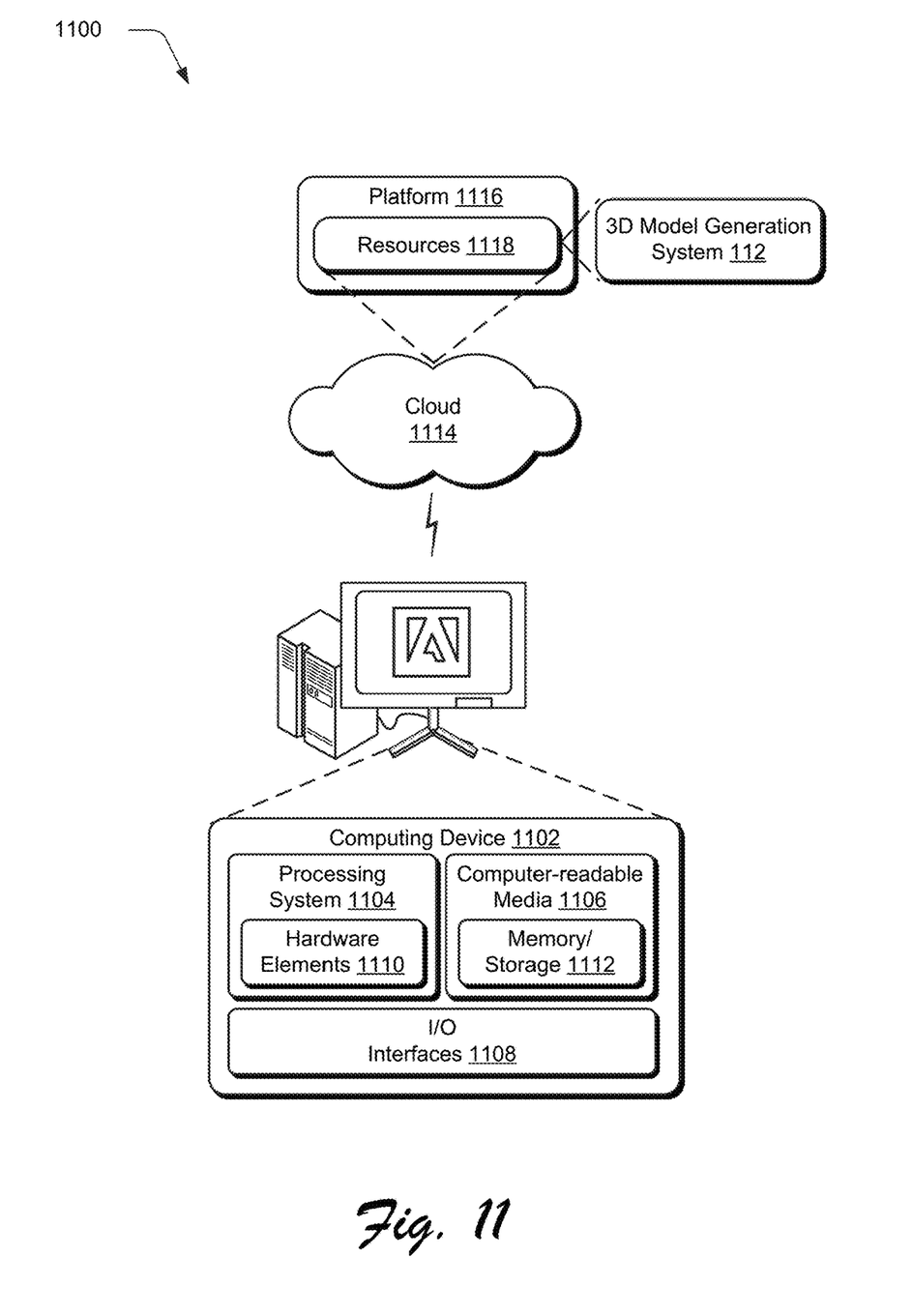
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the 3D model generation system 106. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a three-dimensional model of an object from a plurality of images having different two-dimensional views of the object, a method implemented by a computing device, the method comprising:
   receiving a plurality of inputs by the computing device, the plurality of inputs formed based on user interaction with a user interface, each of the plurality of inputs defining a respective user-specified point on the object in a respective image of the plurality of images;
   generating, by the computing device, a plurality of estimated points on the object, each of the plurality of estimated points corresponding to a respective said user-specified point and defined in real time for multiple different images of the plurality of images than the respective image defining the respective user-specified point;
   displaying, by the computing device, the plurality of estimated points in the user interface;
   mapping, by the computing device, the user-specified points to the estimated points, respectively, in the plurality of images; and
   generating, by the computing device, a mesh of the three-dimensional model of the object based on the mapping.

2. The method as described in claim 1, wherein the generating of the plurality of points and the displaying are performed in real time as the plurality of inputs are received by the computing device.

3. The method as described in claim 1, wherein at least one of the plurality of estimated points is moveable in relation to the object through user interaction with the user interface as correcting an error in an estimated location of the at least one of the plurality of estimated points.

4. The method as described in claim 1, wherein a size of the object in at least one of the plurality of images is different than a size of the object in another one of the plurality of images.

5. The method as described in claim 1, wherein the generating of the mesh includes normalizing locations of the user-specified points and locations of the estimated points.

6. The method as described in claim 1, wherein the generating of the mesh includes mirroring at least one of the user-specified points or at least one of the estimated points to model a portion of the object that is not viewable in the plurality of images.

7. The method as described in claim 1, wherein the generating of the plurality of estimated points includes selecting a template automatically and without user intervention.

8. The method as described in claim 1, further comprising receiving at least one input based on user interaction with the user interface that selects a template from a plurality of templates that is to be used to generate a respective said estimated point from a respective said user-specified point.

9. The method as described in claim 1, further comprising displaying the plurality of images simultaneously in the user interface by the computing device, each of the plurality of images including a different respective view of the object.

10. The method as described in claim 1, further comprising receiving, by the computing device, one or more image identification inputs describing a respective view of the object that is captured by respective ones of the plurality of images and wherein the generating of the mesh is based at least in part a relationship of the respective views of the object.

11. The method as described in claim 1, further comprising receiving one or more inputs that specify a location of the object in respective ones of the plurality of images that is used as part of the generating of the plurality of estimated points.

12. In a digital medium environment to generate a three-dimensional model of an object from a plurality of images having different two-dimensional views of the object, a system comprising:
   a point manager module implemented at least partially in hardware of a processing system and a computer-readable storage medium to:
      receive a plurality of inputs specifying a plurality of user-specified points based on user interaction with a user interface, each of the plurality of inputs defining a respective said user-specified point on the object in a respective image of the plurality of images;
      generate a plurality of estimated points on the object, each of the plurality of estimated points corresponding to a respective said user-specified point and defined in real time for different multiple images of the plurality of images that the respective image defining the respective user-specified point;
      display the plurality of points in the user interface; and
   a mesh generation module implemented at least partially in hardware of the processing system and the computer-readable storage medium to map the plurality of user-specified points to the plurality of estimated points, respectively, and generate a mesh of the three-dimensional model of the object based on the mapping.

13. The system as described in claim 12, wherein at least one of the plurality of estimated points is configured to be moveable in relation to the object based on user interaction with the user interface as correcting an error in an estimated location of the at least one of the plurality of estimated points.

14. The system as described in claim 12, wherein the point manager module is configured to display the plurality of estimated points in real time as the plurality of inputs are received.

15. The system as described in claim 12, wherein a size of the object in at least one of the plurality of images is different than a size of the object in another one of the plurality of images.

16. The system as described in claim 12, wherein the mesh generation module is configured to normalize locations of the user-specified points with respect to locations of the estimated points.

17. The system as described in claim 12, wherein the mesh generation module is configured to mirror at least one of the user-specified points or the estimated points to model a portion of the object that is not viewable in the plurality of images.

18. In a digital medium environment to generate a three-dimensional model of an object from a plurality of images having different two-dimensional views of the object, a method implemented by a computing device, the method comprising:
   receiving an input, formed based on user interaction with a user interface of the computing device, defining a user-specified point on the object in a first image of the plurality of images;

displaying an estimated point in real time on the object by the computing device, the estimated point corresponding the user-specified point for a second image of the plurality of images;

receiving at least one input, by the computing device, based on a user interaction with the user interface, the at least one input defining movement of the estimated point on the object in the second image as correcting an error in an estimated location of the at least one of the plurality of estimated points; and generating a mesh, by the computing device, of the three-dimensional model of the object, the generating including mapping the moved estimated point to the user-specified point.

19. The method as described in claim 18, wherein the displaying is performed in real time as the input defining the user-specified point on the object is received.

20. The method as described in claim 18, wherein a size of the object in at least one of the plurality of images is different than a size of the object in another one of the plurality of images.

\* \* \* \* \*